United States Patent [19]

Bellows et al.

[11] Patent Number: 5,604,047
[45] Date of Patent: Feb. 18, 1997

[54] CARBON MONOXIDE REMOVAL METHOD BASED ON ADSORPTION/STEAM DESORPTION CYCLE

[75] Inventors: Richard J. Bellows, Hampton; John L. Robbins, Stockton, both of N.J.

[73] Assignee: Exxon Research and Engineering Company, Florham Park, N.J.

[21] Appl. No.: 494,206

[22] Filed: Jun. 23, 1995

[51] Int. Cl.$^6$ .................... H01M 8/18; H01M 8/04; B01D 53/02
[52] U.S. Cl. ................... 429/19; 429/17; 95/140
[58] Field of Search .................. 429/17, 19; 45/140

[56] References Cited

U.S. PATENT DOCUMENTS

| | | | |
|---|---|---|---|
| 2,575,519 | 11/1951 | Imhoff et al. | 95/112 |
| 3,221,476 | 12/1965 | Meyer | 95/97 |
| 3,296,449 | 1/1967 | Plust et al. | 429/17 X |
| 3,672,824 | 6/1972 | Tamura et al. | 423/247 |
| 3,699,218 | 10/1972 | Smith et al. | 95/140 X |
| 3,758,666 | 9/1973 | Frevel et al. | 423/247 |
| 3,789,106 | 1/1974 | Hay | 95/140 |
| 3,847,672 | 11/1974 | Trocciola et al. | 429/46 |
| 4,021,210 | 5/1977 | Streich et al. | 95/100 |
| 4,316,880 | 2/1982 | Jockel et al. | 95/140 X |
| 4,470,829 | 9/1984 | Hirai et al. | 95/140 |
| 4,528,170 | 7/1985 | Koecker et al. | 423/245.3 |
| 4,743,276 | 5/1988 | Nishida et al. | 95/140 |
| 4,861,351 | 8/1989 | Nicholas et al. | 95/140 X |
| 5,073,356 | 12/1991 | Guro et al. | 423/418.2 |
| 5,096,470 | 3/1992 | Krishnamurthy | 95/140 X |
| 5,271,916 | 12/1993 | Vanderborgh et al. | 423/246 |
| 5,316,747 | 5/1994 | Pow et al. | 423/247 |
| 5,330,727 | 7/1994 | Trocciola et al. | 422/177 |
| 5,489,327 | 2/1996 | Otsuka et al. | 95/140 X |

*Primary Examiner*—Kathryn Gorgos
*Assistant Examiner*—John S. Starsiak, Jr.
*Attorney, Agent, or Firm*—Joseph J. Dvorak

[57] ABSTRACT

The present invention comprises a method for lowering the carbon monoxide content of a CO-containing hydrogen rich gas stream by contacting the gas stream with an adsorbent capable of preferentially adsorbing the carbon monoxide in the gas stream, the adsorbent being selected from the group consisting of platinum, palladium, ruthenium, rhenium, iridium, the carbides and nitrides of tungsten, molybdenum, vanadium, chromium, tantalum, and mixtures thereof whereby a substantially CO free, hydrogen rich gas stream is obtained. Preferably the absorbent will have a surface area from 0.5 to about 200 $m^2/gm$.

4 Claims, 1 Drawing Sheet

CARBON MONOXIDE REMOVAL METHOD BASED ON ADSORPTION/STEAM DESORPTION CYCLE

FIELD OF THE INVENTION

The present invention relates to a method for lowering the CO content of a hydrogen rich gas mixture. More particularly the present invention is concerned with lowering the CO content of a hydrogen rich gas mixture to render to the gas mixture more suitable for use in fuel cell systems.

BACKGROUND OF THE INVENTION

Fuel cells are devices that convert the fuel and oxidant to electrical energy. Most efficient fuel cells use pure hydrogen as the fuel and oxygen as the oxidant. Unfortunately use of pure hydrogen has a number of known disadvantages not the least of which is its relatively high cost. Consequently, attempts have been made to operate fuel cells using other than the pure hydrogen as the fuel. For example, attempts have been made to use hydrogen rich gas mixtures obtained from steam reforming methanol as a fuel cell feed. These attempts, however, have not resulted in a practical system because carbon monoxide which is present in such gas mixtures degrades cell performance, even in relatively low concentrations.

It is an object of the present invention therefore to treat a CO-containing, hydrogen rich gas mixture to lower the CO content of the mixture to render it more suitable for use in fuel cell systems.

It is another object of the present invention to provide a method for lowering the CO content of a hydrogen rich gas stream in a single step.

It is another object of the present invention to provide a method for reducing the CO content of a hydrogen rich gas stream which is energy efficient.

Another object of the present invention is to provide a fuel cell system in which a CO-containing, hydrogen rich gas stream is subjected to an adsorption step and in which the carbon monoxide is preferentially adsorbed thereby lowering the carbon monoxide content of the gas mixture to below about 10 ppm to provide a substantially CO free, hydrogen rich gas stream which is subsequently fed to the fuel cell for use therein.

SUMMARY OF INVENTION

Simply stated, the present invention comprises a method for lowering the carbon monoxide content of a CO-containing, hydrogen rich gas stream by contacting the gas stream with an adsorbent capable of preferentially adsorbing the carbon monoxide in the gas stream, the adsorbent being selected from the group consisting of platinum, palladium, ruthenium, rhenium, iridium, the carbides and nitrides of tungsten, molybdenum, vanadium, chromium, tantalum and mixtures thereof. Preferably the adsorbent will have a surface area from 0.5 to about 200 $m^2/gm$.

The present invention also involves a fuel cell system comprising a fuel cell including an anode, a cathode and an electrolyte arranged in operative association with a carbon monoxide separator. The system includes means for bringing a hydrogen rich gas in contact with the carbon monoxide separator to provide a substantially carbon monoxide free, hydrogen rich gas and means to feed the substantially CO free gas to the anode of the fuel cell. The separator contains an adsorbent selected from platinum, palladium, ruthenium, rhenium, iridium, the carbides and nitrides of tungsten, molybdenum, vanadium, chromium, tantalum and mixtures thereof. Preferably the system includes means for periodically feeding a desorbent gas to the separator to desorb absorbed carbon monoxide thereby regenerating the adsorbent.

These and other embodiments of the present invention will be described in the following detailed description.

DETAILED DESCRIPTION OF THE INVENTION

The present invention has wide applicability in providing substantially CO free, hydrogen rich gas streams; however, the invention is particularly adapted to providing a hydrogen rich gas stream for use in fuel cells. Therefore, the present invention will be described with particular reference to fuel cell systems.

In general, the gas stream used in the present invention will be obtained by the well-known process of steam reforming a hydrocarbon such as methanol and thereafter subjecting the product gas stream to the equally well-known carbon monoxide shift reaction. The resultant gas stream typically will contain about 0.5% CO. Alternatively, the gas stream may be obtained by partial oxidation of hydrocarbons, especially methane.

Figure 1:
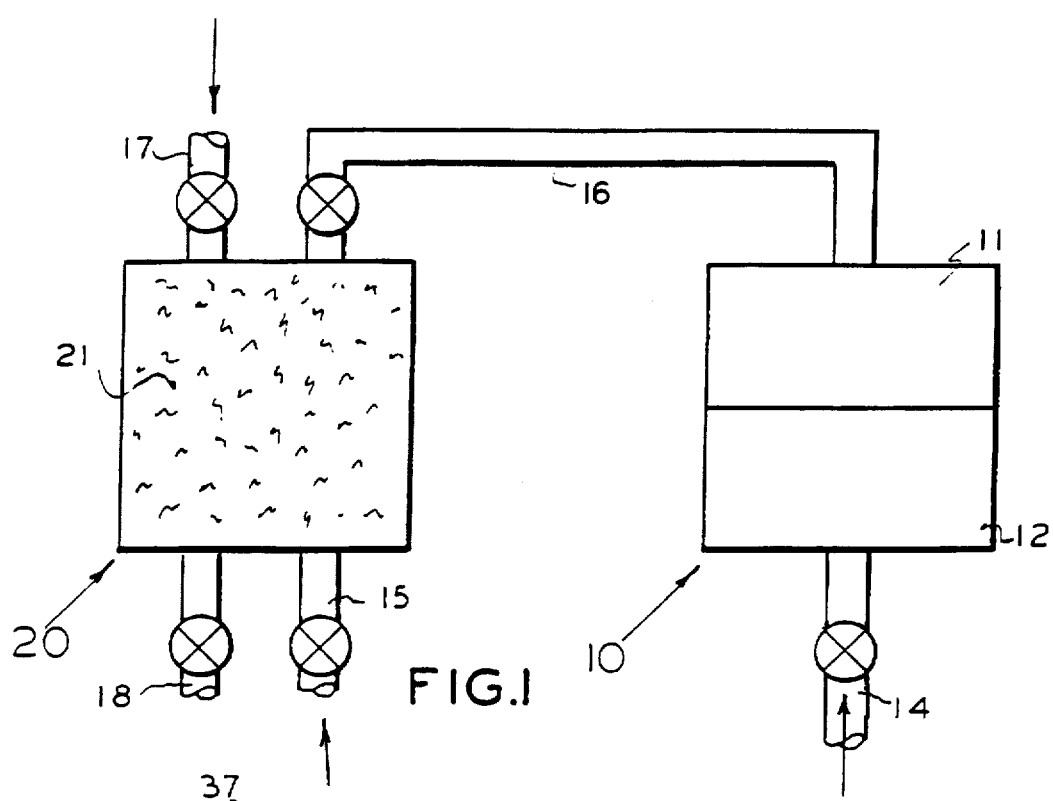
FIG. 1 is a schematic illustration of a fuel cell system including a CO separator utilizing a selective adsorbent in accordance with this invention.

Referring now to FIG. 1, a fuel cell device 10 has been illustrated, for the sake of simplicity, as consisting of a single cell having an anode side or compartment 11 and a cathode side or compartment side 12. A supply line 14 is provided for supplying an oxidant, such as oxygen or air, to the cathode side 12 of the cell. Operably connected to the fuel cell 10 is a carbon monoxide removal apparatus or separator 20. The carbon monoxide removal apparatus 20 is provided with an inlet conduit 15 for introducing a hydrogen rich reformer gas mixture into the apparatus 20.

As shown in the FIG. 1 embodiment, the apparatus 20 contains a bed of solid material 21 capable of selectively adsorbing carbon monoxide in gas mixtures. A conduit 16 is provided in apparatus 20 for removal of substantially CO free, hydrogen rich gas and delivery of the gas to the anode compartment 11 of fuel cell 10. The device 20 also includes a conduit 17 for introducing a sweep gas into the separator 20 for desorbing carbon monoxide adsorbed on solid 21. Also, a conduit 18 is provided for removal of the desorbed carbon monoxide.

In operation, a CO containing, hydrogen rich gas stream, such as that previously described, is introduced via 15 into apparatus 20 for contact with the CO containing adsorbent therein. The purified gas, which is substantially free of carbon monoxide, is removed via line 16 and fed to the anode compartment 11 of fuel cell 10. Prior to the complete utilization of the adsorbant capacity of solid 21, the flow of the purified gas into the apparatus 20 is terminated and a sweep or desorbent gas, such as steam, is introduced via line 17 into the bed to desorb the CO adsorbed therein. In one embodiment of the present invention, an oxygen containing gas, such as air, is introduced into bed 21 with the sweep gas thereby oxidizing the adsorbed CO to $CO_2$ for removal. In a preferred embodiment, however, a generally non-oxidizing sweep gas is used. Indeed, steam is the preferred sweep gas and when steam is used, the CO and steam are removed from the separator 20 via line 18 and preferably are recycled to a steam reformer.

After regeneration of the adsorbent solid 21 in separator 20 is complete, flow of sweep gas is terminated and a CO containing gas is again introduced into apparatus 20 via line 15. The CO free gas stream is then fed via line 16 to anode compartment 11. This procedure can be repeated periodically as desired.

Figure 2:
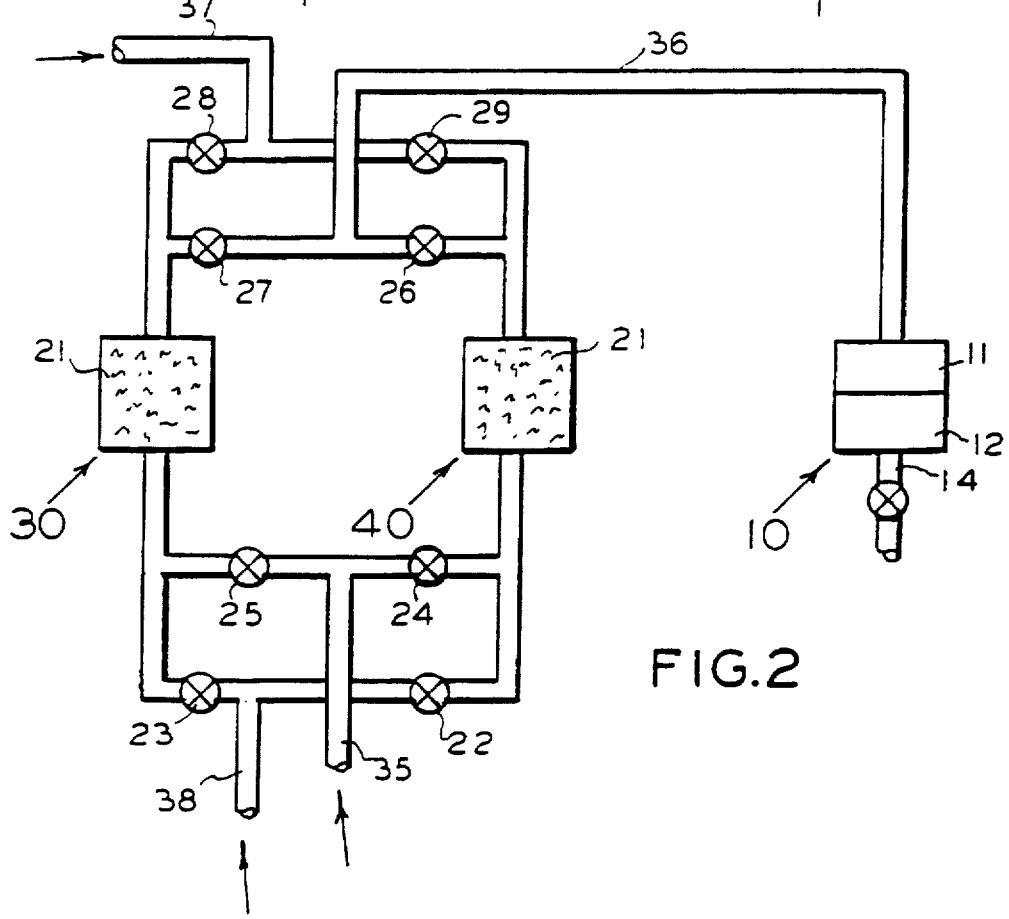
FIG. 2 is a schematic illustration of an alternate embodiment of the invention employing two CO separators in combination with a fuel cell.

In an alternate embodiment of the present invention shown in FIG. 2, two separators 30 and 40 are provided, each containing an adsorbent material 21 capable of selectively adsorbing carbon monoxide. The hydrogen rich, carbon monoxide gas to be treated is introduced alternately to separators 30 and 40 via line 35. The treated gas having substantially all of the CO removed is discharged alternately from the adsorbers 30 and 40 via line 36 and is sent to anode compartment 11 of fuel cell 10.

Periodically, the separators 30 and 40 must be purged or reactivated to remove the adsorbed carbon monoxide from the adsorbent. This purging is done by introducing a sweep gas, such as steam, via line 37. The sweep gas will flow through adsorbers 30 or 40, as the case may be, and be removed via line 38. The various valves 22 through 29 are operated in appropriate sequence to permit the alternate use of separators 30 and 40. For example, when valves 24 and 26 are open and valves 25, 27, 22, and 29 are closed, the CO containing, hydrogen rich gas introduced via line 35 will flow through the adsorbent material 21 in separator 40 and pass via line 36 into the anode compartment 11 of fuel cell 10. Before complete utilization of the adsorbent capacity of the adsorbent material 21 in separator 40, valves 24 and 26 will be closed and valves 25 and 27 will be open permitting the flow of reformer gas through the adsorbent material 21 in separator 30. At the same time with valves 28 and 23 closed and valves 22 and 29 open, a sweep gas such as steam, is introduced via line 37 and will flow through the separator 40 for discharge through line 38. Optionally and preferably the desorbed CO containing gas is recycled to a steam reformer for the generation of additional hydrogen; however, it may be oxidized to $CO_2$ and otherwise disposed of.

In the practice of the present invention the adsorbent 21 is one which is capable of selectively adsorbing CO in a reformer gas stream to provide a hydrogen rich gas stream containing less than about 10 ppm CO and preferably below about 1 ppm and preferably to a stream totally free of CO. Solid adsorbents useful include platinum, palladium, ruthenium, rhenium, iridium, and the carbides and nitrides of tungsten, molybdenum, vanadium, chromium, tantalum and mixtures thereof. The preferred adsorbents will have a surface area in the range of from about 0.5 to about 200 $m^2/gm$. Especially preferred are the carbides and nitrides of tungsten and molybdenum.

The amount of adsorbent used will depend of course upon the CO content of the gas stream to be treated, the gas flow rate and the desired length of time to elapse before desorption is required. Typically, the CO containing gas stream will be processed at pressures of from about 0.5 to about 10 atmospheres at temperatures in the range of about 25° C. to about 500° C. Preferred pressure and temperature ranges are 1 to 5 atmospheres and 70° C. to 300° C., respectively.

While the present invention has been illustrated and described as embodied in a particular arrangement of a selective CO adsorbing apparatus for use in removal of CO from a gaseous fuel being supplied to a fuel cell, it should be appreciated that the present invention is not limited to this particular example. Rather, the scope of the present invention is to be determined in accordance with the appended claims.

We claim:

1. A fuel cell system comprising:

a fuel cell having an anode compartment and a cathode compartment;

at least a first separator containing an adsorbent selected from the group consisting of platinum, palladium, ruthenium, rhenium, iridium, the carbides and nitrides of tungsten, molybdenum, vanadium, chromium, tantalum and mixtures thereof, having a surface area in the range of from about 0.5 to about 200 $m^2/gm$, and wherein the adsorbent selectively adsorbs CO in a CO containing hydrogen gas stream to produce a substantially CO free, hydrogen rich gas stream;

a conduit for feeding a CO containing, hydrogen feed gas stream to the separator;

a conduit operably connecting the separator to the anode compartment of the fuel cell for delivering the substantially CO free, hydrogen rich gas stream thereto;

a conduit for feeding a sweep gas to the separator to desorb adsorbed CO; and a conduit for feeding an oxidant to the cathode compartment.

2. The system of claim 1 including a second separator containing an adsorbent selected from the group consisting of platinum, palladium, ruthenium, rhenium, iridium, the carbides and nitrides of tungsten, molybdenum, vanadium, chromium, tantalum and mixtures thereof, having a surface area in the range of from about 0.5 to about 200 $m^2/gm$, and wherein the adsorbent of selectively adsorbs CO in a CO containing hydrogen gas stream to produce a substantially CO free, hydrogen rich gas stream and (a) valve means for alternately feeding the feed gas to one of the first or second separators, (b) valve means for alternately delivering the CO free, hydrogen rich gas stream from one of the first or second separators to the anode compartment, (c) valve means for alternately feeding sweep gas to one of the first or second separators to desorb adsorbed CO, and (d) valve means for alternately removing CO enriched sweep gas from one of the first or second separator.

3. The system of claim 2 wherein the adsorbent is tungsten carbide.

4. The system of claim 2 wherein the adsorbent is molybdenum carbide.

\* \* \* \* \*